United States Patent
Patton et al.

(10) Patent No.: US 10,193,918 B1
(45) Date of Patent: Jan. 29, 2019

(54) BEHAVIOR-BASED RANSOMWARE DETECTION USING DECOY FILES

(71) Applicant: Malwarebytes Inc., Santa Clara, CA (US)

(72) Inventors: Mark William Patton, San Jose, CA (US); Nathan Scott, Coconut Creek, FL (US); Ramon Royo Gutierrez, Baracaldo (ES); Sherab Giovannini, Portugalete (ES)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 15/939,273

(22) Filed: Mar. 28, 2018

(51) Int. Cl.
  *G06F 21/56* (2013.01)
  *H04L 29/06* (2006.01)

(52) U.S. Cl.
  CPC ...... *H04L 63/1425* (2013.01); *H04L 63/1491* (2013.01)

(58) Field of Classification Search
  CPC ............. H04L 63/1425; H04L 63/1491; H04L 63/1416; G06F 21/554; G06F 21/56; G06F 11/1451; G06F 21/566
  USPC ...................................................... 726/22–25
  See application file for complete search history.

(56) References Cited

U.S. PATENT DOCUMENTS

| | | | | |
|---|---|---|---|---|
| 8,990,944 B1* | 3/2015 | Singh | .................... | G06F 21/56 726/24 |
| 9,317,686 B1* | 4/2016 | Ye | ........................ | G06F 11/1461 |
| 9,807,115 B2* | 10/2017 | Kolton | .................. | H04L 63/145 |
| 2016/0180087 A1* | 6/2016 | Edwards | ............... | G06F 21/566 726/24 |
| 2016/0292419 A1* | 10/2016 | Langton | ................ | G06F 21/567 |
| 2016/0378988 A1* | 12/2016 | Bhashkar | .............. | G06F 21/566 726/24 |
| 2017/0324755 A1* | 11/2017 | Dekel | ................... | H04L 63/145 |
| 2018/0034835 A1* | 2/2018 | Iwanir | ................. | H04L 63/1416 |
| 2018/0211038 A1* | 7/2018 | Breiman | ................ | G06F 11/14 |
| 2018/0248896 A1* | 8/2018 | Challita | ............. | G06F 11/1451 |

* cited by examiner

*Primary Examiner* — Shanto Abedin
(74) *Attorney, Agent, or Firm* — Fenwick & West LLP

(57) ABSTRACT

An anti-malware application analyzes behavior of an executing process to identify ransomware. The anti-malware application detects an untrusted process requesting enumeration of a directory of user files and causes the untrusted process to initially operate on a decoy file that mimics the user files. If the behavior of the untrusted process with respect to the decoy file is indicative of ransomware, the process can be terminated without loss of the user files. The decoy file may be deployed in a way that is undetectable to the user.

14 Claims, 3 Drawing Sheets

BEHAVIOR-BASED RANSOMWARE DETECTION USING DECOY FILES

FIELD OF ART

The present disclosure generally relates to malware detection and more specifically to behavior-based ransomware detection using decoy files.

BACKGROUND

Ransomware is malware that encrypts or locks computer files, and then demands payment of a "ransom" to decrypt or unlock them. There is no guarantee that paying the ransom will regain access and victims of ransomware can be subject to multiple attacks if they are not protected. Conventional techniques for detecting ransomware may involve monitoring the behavior of executing processes to detect when the processes behave in a way indicative of ransomware. However, these behavior-based detection methods are often unable to detect and stop the ransomware before it has successfully encrypted one or more files. As a result, some user files may become irrecoverably lost.

SUMMARY

A method detects and remediates ransomware. An anti-ransomware module monitors an untrusted process executing on a client device. The anti-ransomware module detects a request by the untrusted process to enumerate a directory containing a user file. The anti-ransomware module causes a decoy file to be returned to the untrusted process in response to the request. The anti-ransomware module monitors actions of the untrusted process performed on the decoy file. The anti-ransomware module identifies the untrusted process as ransomware based on the monitored actions of the untrusted process on the decoy file. The anti-ransomware module remediates the untrusted process responsive to identifying the process as ransomware.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An anti-malware application stops ransomware attacks and remediates the ransomware file causing the attack. The anti-malware application uses behavior-based detection to identify ransomware. The anti-malware application detects untrusted processes and causes the untrusted processes to initially operate on decoy files that mimic user files typically targeted by ransomware. If the behavior of the untrusted process with respect to the decoy files is indicative of ransomware, the process can be terminated without loss of the user files. Alternatively, if the behavior is deemed harmless, the anti-malware application can allow the process to proceed to execute on the user files. The decoy files may be deployed in a way that makes them undetectable to the user.

Figure 1:
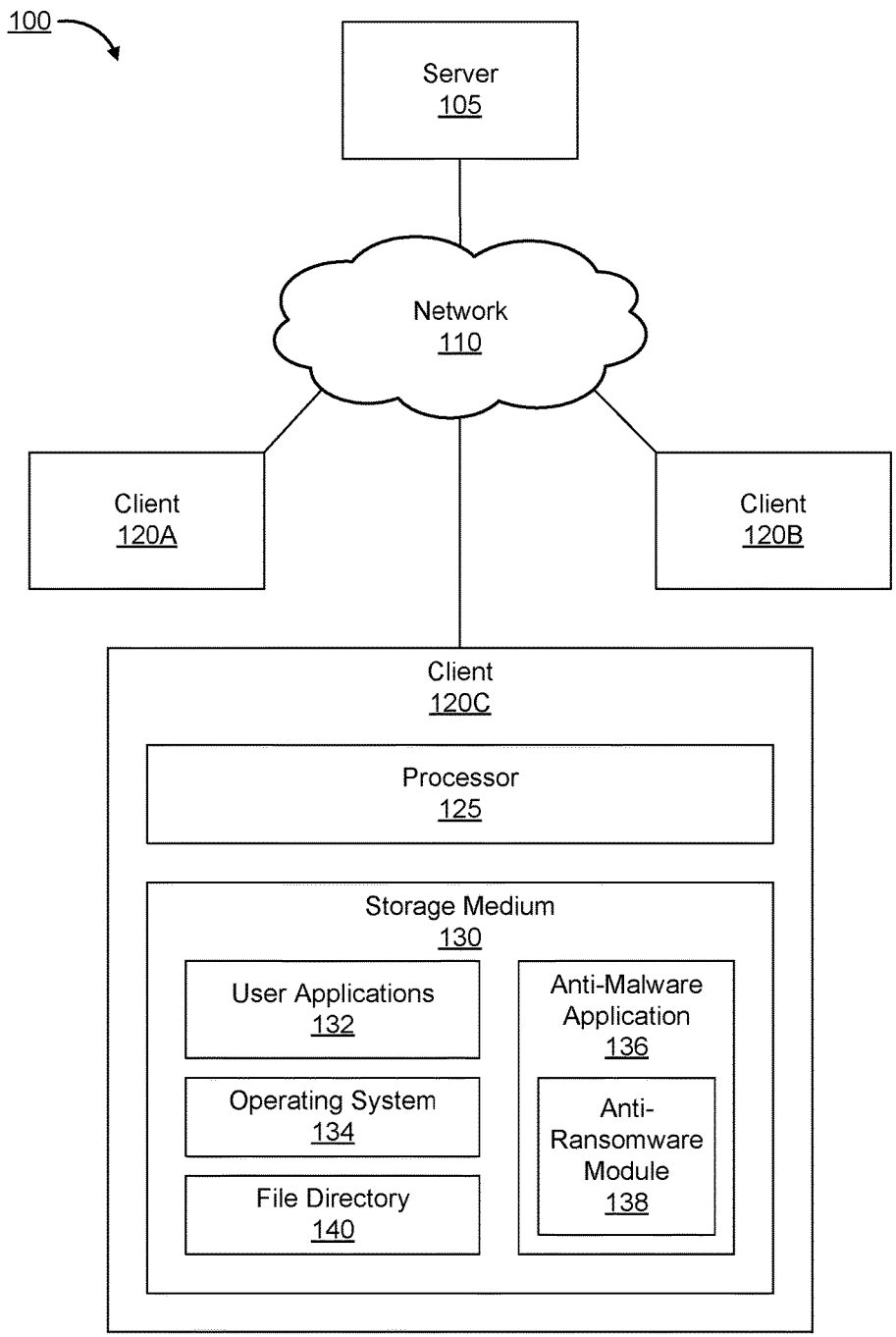
FIG. 1 is a system diagram illustrating an example embodiment of an environment in which an anti-malware application executes.

FIG. 1 is a high-level block diagram illustrating a system environment 100 for an anti-malware application. The system environment 100 comprises a server 105, a network 110, and various clients 120A, 120B, 120C (collectively referenced herein as clients 120). For simplicity and clarity, only one server 105 and a limited number of clients 120 are shown; however, other embodiments may include different numbers of servers 105 and clients 120. Furthermore, the system environment 100 may include different or additional entities.

The server 105 is a computer system configured to store, receive, and transmit data to client devices 120 via the network 110. The server 105 may include a singular computing system, such as a single computer, or a network of computing systems, such as a data center or a distributed computing system. In an embodiment, the server 105 is a content or data server providing information to a client 120. For example, the server 105 may be a website server that provides web content for viewing on clients 120. Furthermore, the server 105 may be a file server that provides files that can be downloaded by the clients 120. The server 105 may receive requests for data from clients 120 and respond by transmitting the requested data to the clients 120. The server 105 is a potential source of malware that may infiltrate one or more clients 120. For example, as a user browses websites or downloads network files, malware embedded in the website or files may become installed on a client 120, often without the user's knowledge.

The network 110 represents the communication pathways between the server 105 and clients 120. In one embodiment, the network 110 is the Internet. The network 110 can also utilize dedicated or private communications links that are not necessarily part of the Internet. In one embodiment, the network 110 uses standard communications technologies and/or protocols. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client device 120 may be a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, discs and the like. In addition to storing program instructions, the storage medium 130 stores various data associated with operation of the operating system 134, the anti-malware application 136, and other applications 132.

In one embodiment, the storage medium 130 comprises a non-transitory computer-readable storage medium. Various executable programs (e.g., the operating system 134, anti-malware application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. An operating system 134 may manage the processor 125, storage medium 130, or other components not illustrated such as, for example, a graphics adapter, an audio adapter, network connections, disc drives, and USB slots. Because many programs and executing processes compete for the limited resources provided by the processor 125, the operating system 134 may manage the processor bandwidth and timing to each requesting process.

The user applications 132 may include applications for performing a particular set of functions, tasks, or activities for the benefit of the user. Examples of user applications 132 may include a word processor, a spreadsheet application, and a web browser. In some cases, a user application 132 can be a source of malware that is unknowingly hidden in the user application 132. The malware may infect the client 120 when the user application 132 is installed or when it executes.

The file directory 140 stores files. Files may include system files associated with operation of the operating system 134, the user applications 132, or the anti-malware application 136. The files may furthermore include user files that may be created or modified by users. Examples of user files may include, for example, image files, video files, word processor documents, spreadsheet documents, and drawing files. User files are generally highly valuable to the users because they may be personal in nature and may be difficult or impossible to recover or replace if compromised. As a result, ransomware frequently targets user files.

An anti-malware application 136 detects, stops, and removes malware, which may include ransomware as well as other types of malware. The anti-malware application 136 may prevent new malware from being installed on a client 120 or remove or disable existing malware that is already present on the client 120. The anti-malware application 136 may furthermore download new malware definitions from the network 110 that specify characteristics or behaviors of known malware that the anti-malware application 136 seeks to detect. The anti-malware application includes an anti-ransomware module 138 that is specifically configured to detect, halt, and remove ransomware. The anti-ransomware module 138 is described in further detail below.

Figure 2:
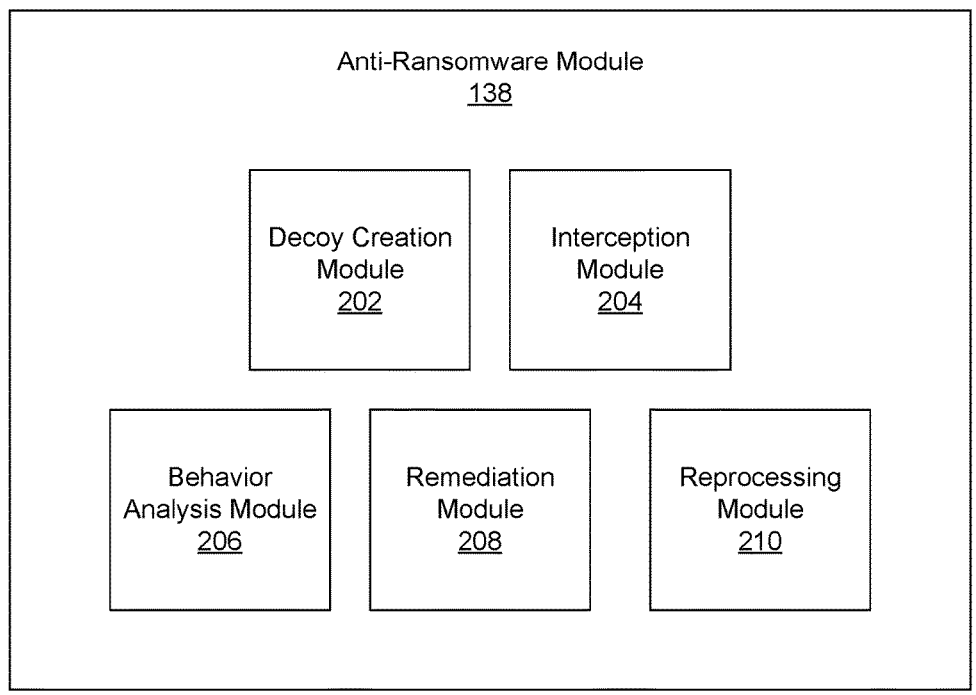
FIG. 2 is a block diagram illustrating an example embodiment of an anti-ransomware module of the anti-malware application.

FIG. 2 illustrates an example embodiment of an anti-ransomware module 138. The anti-ransomware module includes a decoy creation module 202, an interception module 204, a behavior analysis module 206, and a remediation module 208. Alternative embodiments may include different or additional modules or omit one or more of the illustrated modules.

The decoy creation module 202 creates decoy files that act as initial targets for a ransomware attack in order to protect the user files. The decoy creation module 202 constructs the decoy files to have characteristics similar to those of the user files that are likely to be targeted by ransomware. For example, the decoy files may have the same file extension, file size, file name, header information, or other characteristics as corresponding user files. In one embodiment, the decoy creation module 202 generates the decoy files by creating copies of user files detected within the file directory 140. In this way, the decoy files may be virtually indistinguishable from the user files.

The decoy creation module 202 creates the decoy files so that they are not visible to the user via ordinary user activities such as browsing or searching the file directory 140. For example, the decoy files may be stored to a memory location that is accessible only by the operating system kernel and is not accessible to the user. The memory location may be protected by the anti-malware application 136 to prevent tampering with the decoy files.

In one embodiment, the decoy creation module 202 may create a repository of decoy files that are representative of the user files in the file directory 140. For example, the repository of decoy files may include files of varying file type, file size, or other characteristics that are representative of the user files in the file directory 140. The decoy files may be placed into user file directories that may be targeted by ransomware attacks. Alternatively, the decoy creation module 202 may generate one or more decoy files in an on-demand manner when suspicious activity associated with a particular user file is detected. For example, when an untrusted process requests access to a particular user file directory, the decoy creation module 202 may generate decoy files that may include copies of the user files in the file directory.

The interception module 204 monitors processes executing on the client 120 and intercepts actions from untrusted processes that are consistent with the start of a ransomware attack. In an embodiment, the interception module 204 identifies processes that seek to modify a group of files within a file directory or set of directories. For example, the interception module 204 detects when an untrusted process makes an application programming interface (API) call associated with enumerating a directory or file folder in the file directory 140. API calls associated with enumerating a directory may include, for example, API calls for reading a file structure of a directory to obtain a list of files within the directory or API calls for opening or modifying multiple files within a file directory (e.g., performing compression operations or batch renaming of files in a file directory). In the WINDOWS operating system environment, examples of API calls associated with enumerating a directory may include the find_first() find_first_x() find_next() and find_next_x( )API calls.

In an embodiment, the interception module 204 may determine whether a particular process is trusted or untrusted prior to intercepting any actions. For example, the interception module 204 may determine if a signature associated with the process matches a signature on a whitelist and deem the process trusted if a match is detected. The interception module 204 may also deem the process trusted if it has a digital certificate associated with a trusted source. Because ransomware typically executes soon after being installed, the interception module 204 may also deem a process trusted if the process executes from a program that was installed before a predefined time period. In other embodiments, the interception module 204 may deem a process trusted only when a combination of the above factors are present.

If the interception module 204 determines that the process is trusted, it allows the process to proceed without intervention. Otherwise, if the process is not deemed trusted (i.e., the process is untrusted), the interception module 204 intercepts actions (e.g., API calls) performed by the untrusted process associated with enumerating files before the action executes. Upon intercepting an action from an untrusted process, the interception module 204 identifies one or more files or file directories targeted by the action (e.g., by parsing the arguments of the API call). Instead of returning a user file from the targeted file directory to the untrusted process, the interception module 204 returns a decoy file to the untrusted process. The decoy file may have similar or identical characteristics to the files targeted by the action of the untrusted process such that the decoy file is virtually indistinguishable from the targeted files from the perspective of untrusted process. The decoy file may be obtained from a repository that stores decoy files created in advance. For example, based on the user file being targeted, the interception module 204 may obtain a decoy file from the repository that has characteristics similar to the targeted files. Alternatively, the interception module 204 may cause the decoy creation module 202 to generate the decoy file dynamically upon the interception module 204 intercepting the action (e.g., by creating a copy of a file in a targeted directory or group of files).

The behavior analysis module 206 monitors behavior of the untrusted process with respect to the decoy file to determine whether it exhibits malicious behavior. For example, the behavior analysis module 206 may determine that the untrusted process exhibits malicious behavior if it encrypts the decoy file and otherwise determine that it does not exhibit malicious behavior if it does not encrypt the decoy file. In another embodiment, a multifactor analysis may be performed to determine whether the untrusted process exhibits malicious behavior. Here, the behavior analysis module 206 detects one or more individual actions performed by the untrusted process on the decoy file that conform to a one or more predefined set of actions indicative of ransomware. Different types of actions may be associated with different sub-scores. For example, actions that are strongly associated with ransomware (e.g., encrypting the file) may have higher sub-scores while actions that are more weakly associated with ransomware (e.g., editing a file) may have lower sub-scores. The behavior analysis module 206 may generate a cumulative score associated with the behavior of the process with respect to a particular decoy file based on a combination of the sub-scores. The behavior analysis module 206 may then determine that the behavior of the untrusted process with respect to the decoy file is malicious if the cumulative score exceeds a predefined threshold score and otherwise determine that the behavior is not malicious.

The behavior analysis module 206 may monitor behavior of the untrusted process with respect to multiple decoy files that are each provided to the untrusted process upon the interception module 204 intercepting actions of the untrusted process. The behavior analysis module may track a count of decoy files on which the untrusted process acted maliciously and a count of decoy files on which the untrusted process did not act maliciously. In one embodiment, the respective counts may be tracked until a stopping criterion is reached. For example, the respective counts may be tracked for a particular predefined number of decoy files, for a particular predefined time period, or until one of the counts reaches a particular predefined threshold. The behavior analysis module 206 may then determine if the untrusted process is ransomware based on the respective counts. For example, in one embodiment, the behavior analysis module 206 may determine that the untrusted process is ransomware if the untrusted process acts maliciously with respect to a predefined threshold number of decoy files. Alternatively, the behavior analysis module 206 may determine that the untrusted process is ransomware if the untrusted process acts maliciously on a number of decoy files at least a predefined threshold value greater than the number of decoy files that the untrusted process does not act maliciously. Otherwise, the behavior analysis module 206 may detect that the untrusted process is safe (i.e., is not ransomware).

The remediation module 208 operates to remediate the ransomware when the behavior analysis module 206 detects that a particular process is ransomware. Remediation may include terminating the process that triggered the detection and any related processes, identifying a source file that triggered execution of the process, and quarantining the source file. Quarantining the file isolates the file so that it is no longer capable of affecting operation of the client 120. Quarantining may include deleting the source file or moving it to a special area of memory.

Otherwise, if the behavior analysis module 206 determines that the process is not ransomware, the process is allowed to proceed to operate on the targeted user files. The anti-ransomware module 138 may optionally add the process to the list of trusted processes so that its behavior need not be monitored again upon future execution of the process that was deemed not to be ransomware.

Figure 3:
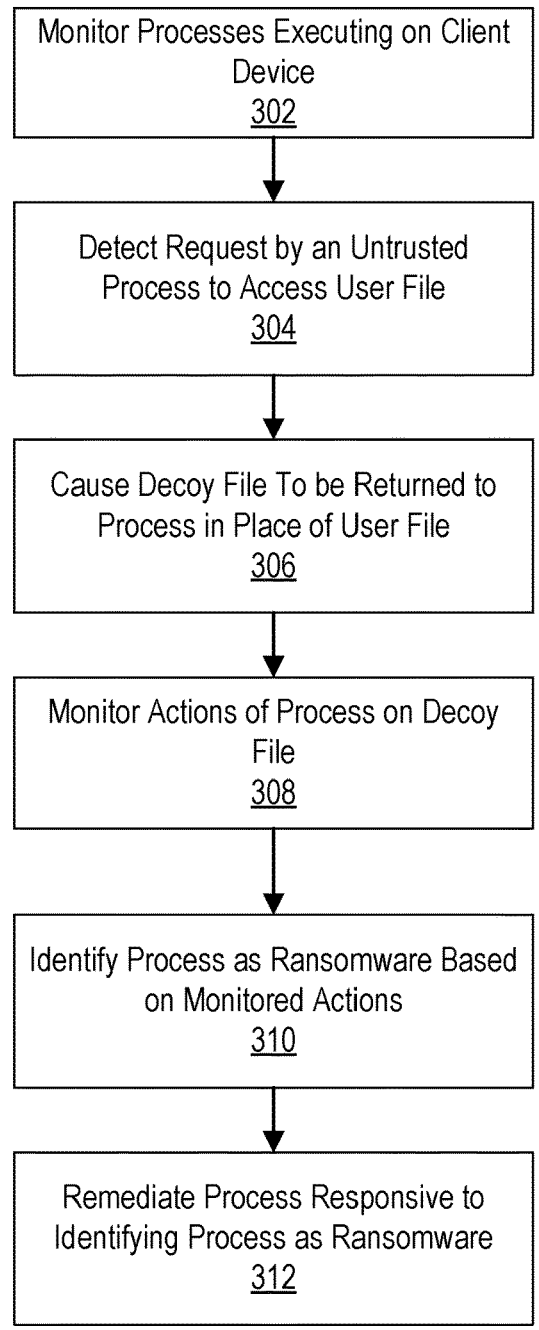
FIG. 3 is a flowchart illustrating an embodiment of a process for detecting and remediating a ransomware attack.

FIG. 3 is a flowchart illustrating an embodiment of a process for detecting and remediating ransomware. The anti-ransomware module 138 monitors 302 processes executing on a client device 120. The anti-ransomware module 138 detects 304 a request by an untrusted process to access a directory containing one or more user files. For example, the anti-ransomware module 138 may detect when an untrusted process executes actions to enumerate a file directory in which user files are located. The anti-ransomware module may identify a process as being untrusted if it is absent from a whitelist of trusted processes. In response to the request, the anti-ransomware module 138 causes 306 a decoy file to be returned to the untrusted process in place of a targeted user file. The anti-ransomware module 138 monitors 308 actions of the process performed on the decoy file. For example, the anti-ransomware module 138 determines if the process encrypts the decoy file or performs another action or a combination of actions that are indicative of ransomware. The anti-ransomware module 138 identifies 310 the process as ransomware based on the monitored actions. Here, the ransomware module 138 may maintain a count of the number of decoy files on which the process performs the actions indicative of ransomware and count of the number of decoy files on which the process operated in a manner not indicative of ransomware. The anti-ransomware module 138 may then determine whether or not the process is ransomware based on the respective counts. The anti-ransomware module 138 remediates 312 the process responsive to identifying the process as ransomware. For example, the anti-ransomware module 138 may terminate the process and may quarantine a source file responsible for launching the process. Alternatively, if the anti-ransomware module 138 determines that the process is not ransomware, the anti-ransomware module 138 may enable the process to proceed to operate on the targeted user files without further intercepting the actions.

The above-described system and processes beneficially enables behavior-based detection and remediation of ransomware loss of any user files prior to detection. By causing the ransomware to instead execute on decoy files, the user files can remain protected until the ransomware is detected and remediated.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for detecting and remediating ransomware, the method comprising:
   monitoring a plurality of processes executing on a client device;
   identifying, from the plurality of processes, an untrusted process that is absent from a whitelist of trusted processes;
   monitoring the untrusted process executing on the client device;
   detecting a request by the untrusted process to enumerate a directory containing one or more user files;
   causing a decoy file to be returned to the untrusted process in response to the request;
   monitoring actions of the untrusted process performed on the decoy file;
   determining sub-scores associated with each of the monitored actions performed on the decoy file;
   generating a cumulative score for the untrusted process based on a combination of the sub-scores associated with the monitored actions;
   determining that the cumulative score for the untrusted process exceeds a predefined threshold score;
   responsive to determining that the cumulative score exceeds the predefined threshold score, determining that behavior of untrusted process exhibited malicious behavior with respect to the decoy file;
   identifying, by a processor, the untrusted process as corresponding to the ransomware based at least in part on determining that the untrusted process exhibited the malicious behavior with respect to the decoy file; and
   remediating the untrusted process responsive to identifying the process as corresponding to the ransomware.

2. The method of claim 1, wherein identifying the untrusted process as corresponding to the ransomware comprises:
   storing a count of decoy files on which the untrusted process exhibited malicious behavior; and
   identifying the untrusted process as corresponding to the ransomware responsive to the count exceeding a predefined threshold.

3. The method of claim 1, wherein causing the decoy file to be returned to the untrusted process in response to the request comprises:
   determining a location of the decoy file in a storage of the computing device; and
   retrieving the decoy file from the storage.

4. The method of claim 1, wherein causing the decoy file to be returned to the process in response to the request comprises:
   generating the decoy file in response to detecting the request.

5. The method of claim 1, wherein the decoy file comprises a copy of the one or more user files.

6. A non-transitory computer-readable storage medium storing instructions for detecting and remediating ransomware, the instructions when executed by a processor cause the processor to perform steps including:
   monitoring a plurality of processes executing on a client device;

identifying, from the plurality of processes, an untrusted process that is absent from a whitelist of trusted processes;

monitoring the untrusted process executing on the client device;

detecting, by a processor, a request by the untrusted process to enumerate a directory containing one or more user files;

causing a decoy file to be returned to the untrusted process in response to the request;

monitoring actions of the untrusted process performed on the decoy file;

determining sub-scores associated with each of the monitored actions performed on the decoy file;

generating a cumulative score for the untrusted process based on a combination of the sub-scores associated with the monitored actions;

determining that the cumulative score for the untrusted process exceeds a predefined threshold score;

responsive to determining that the cumulative score exceeds the predefined threshold score, determining that behavior of untrusted process exhibited malicious behavior with respect to the decoy file;

identifying the untrusted process as corresponding to the ransomware based at least in part on determining that the untrusted process exhibited the malicious behavior with respect to the decoy file; and remediating the untrusted process responsive to identifying the process as corresponding to the ransomware.

7. The non-transitory computer-readable storage medium of claim 6,
wherein identifying the untrusted process as corresponding to the ransomware comprises:
storing a count of decoy files on which the untrusted process exhibited malicious behavior; and
identifying the untrusted process as corresponding to the ransomware responsive to the count exceeding a predefined threshold.

8. The non-transitory computer-readable storage medium of claim 6, wherein
causing the decoy file to be returned to the untrusted process in response to the request comprises:
determining a location of the decoy file in a storage of the computing device; and
retrieving the decoy file from the storage.

9. The non-transitory computer-readable storage medium of claim 6, wherein causing the decoy file to be returned to the process in response to the request comprises:
generating the decoy file in response to detecting the request.

10. The non-transitory computer-readable storage medium of claim 6, wherein the decoy file comprises a copy of the one or more user files.

11. A computing system comprising:
a processor; and
a non-transitory computer-readable storage medium storing instructions for detecting and remediating ransomware, the instructions when executed by the processor cause the processor to perform steps including:
monitoring a plurality of processes executing on a client device;
identifying, from the plurality of processes, an untrusted process that is absent from a whitelist of trusted processes;
monitoring the untrusted process executing on the client device;
detecting, by a processor, a request by the untrusted process to enumerate a directory containing one or more user files;
causing a decoy file to be returned to the untrusted process in response to the request;
monitoring actions of the untrusted process performed on the decoy file;
determining sub-scores associated with each of the monitored actions performed on the decoy file;
generating a cumulative score for the untrusted process based on a combination of the sub-scores associated with the monitored actions;
determining that the cumulative score for the untrusted process exceeds a predefined threshold score;
responsive to determining that the cumulative score exceeds the predefined threshold score, determining that behavior of untrusted process exhibited malicious behavior with respect to the decoy file;
identifying the untrusted process as corresponding to the ransomware based at least in part on determining that the untrusted process exhibited the malicious behavior with respect to the decoy file; and
remediating the untrusted process responsive to identifying the process as corresponding to the ransomware.

12. The computing system of claim 11, wherein identifying the
untrusted process as corresponding to the ransomware comprises:
storing a count of decoy files on which the untrusted process exhibited malicious behavior; and
identifying the untrusted process as corresponding to the ransomware responsive to the count exceeding a predefined threshold.

13. The computing system of claim 11, wherein causing the decoy file to be
returned to the untrusted process in response to the request comprises:
determining a location of the decoy file in a storage of the computing device; and
retrieving the decoy file from the storage.

14. The computing system of claim 11, wherein causing the decoy file to be
returned to the process in response to the request comprises:
generating the decoy file in response to detecting the request.

* * * * *